United States Patent [19]
Fujii et al.

[11] Patent Number: 5,335,309
[45] Date of Patent: Aug. 2, 1994

[54] LIGHT-BEAM HEATING APPARATUS

[75] Inventors: Koji Fujii; Nobuyuki Haji, both of Osaka; Minoru Yamada, Nishinomiya, all of Japan

[73] Assignee: Matsushita Electric Industrial Co., Ltd., Kadoma, Japan

[21] Appl. No.: 87,105

[22] Filed: Jul. 1, 1993

Related U.S. Application Data

[63] Continuation of Ser. No. 886,333, May 20, 1992, abandoned.

[30] Foreign Application Priority Data

Aug. 29, 1991 [JP] Japan .................. 3-218345
Oct. 1, 1991 [JP] Japan .................. 3-253359

[51] Int. Cl.⁵ .............................................. H05B 1/00
[52] U.S. Cl. ..................... 392/421; 219/85.12; 362/285; 250/205; 250/201.4
[58] Field of Search ............... 392/421, 411, 415, 419; 219/498, 502, 85.12, 85.13; 362/220, 285; 250/201.4, 205, 227.11; 315/158, 307, 151

[56] References Cited

U.S. PATENT DOCUMENTS

| | | | |
|---|---|---|---|
| 1,107,438 | 8/1914 | Moskowitz | 250/205 |
| 1,338,818 | 5/1920 | Dennington | 362/285 |
| 1,762,325 | 10/1930 | Blair et al. | 392/421 |
| 3,455,622 | 7/1969 | Cooper | 392/421 |
| 3,670,202 | 6/1972 | Paine | 315/158 |
| 3,717,743 | 2/1973 | Costello | 392/421 |
| 3,764,772 | 10/1973 | Matuschek | 392/421 |
| 3,904,873 | 9/1975 | Demaine et al. | 250/570 |
| 3,949,226 | 4/1976 | Dugan et al. | 250/205 |
| 4,024,428 | 5/1977 | Bachur | 315/158 |
| 4,156,626 | 5/1979 | Souder | 392/419 |
| 4,225,245 | 9/1980 | Roiret | 250/205 |
| 4,368,384 | 1/1983 | Kato | 250/205 |
| 4,701,608 | 10/1987 | Morita et al. | 250/205 |
| 4,812,641 | 3/1989 | Ortiz, Jr. | 250/205 |
| 4,836,138 | 6/1989 | Robinson et al. | 118/725 |
| 4,860,172 | 8/1989 | Schlager et al. | 362/32 |
| 4,921,326 | 5/1990 | Wild et al. | 128/4 |
| 4,982,139 | 1/1991 | Amir et al. | 315/151 |
| 4,998,043 | 3/1991 | Unami et al. | 315/151 |
| 5,039,191 | 8/1991 | Myszka | 250/227.11 |

FOREIGN PATENT DOCUMENTS 383360 10/1923 Fed. Rep. of Germany ...... 392/421

OTHER PUBLICATIONS

Patent Abstracts of Japan (unexamined applications), M. Field, vol. 16, No. 26, Jan. 22nd, 1992 The Patent Office Japanese Government.

Primary Examiner—Bruce A. Reynolds
Assistant Examiner—John A. Jeffery
Attorney, Agent, or Firm—Spencer, Frank & Schneider

[57] ABSTRACT

A light-beam heating apparatus utilizes light energy effectively by having a light emitting portion of a radiating lamp coincide with a first focal point of an ellipsoidal reflecting mirror automatically and with high accuracy Light intensity and positional information at a light receiving end of an optical fiber are detected by means of a photodetector, a light intensity signal converted by a photoelectric converter is inputted to an arithmetic drive circuit, a drive mechanism of a radiating lamp fitting mechanism is actuated, the light emitting portion of the radiating lamp is moved in the X-axis direction, the Y-axis direction and the Z-axis direction successively in a direction that the light intensity increases, a central axis of a distribution of light condensed by an ellipsoidal reflecting mirror and a central part of the light receiving end of the optical fiber are made to always coincide with each other so as to utilize the light energy effectively. The light energy incident to the optical fiber is computed from a light intensity signal and a detected position, and a lamp current is controlled so as to make the error with respect to an indicated value of a command circuit smaller, thereby to stabilize the light radiation energy at a predetermined value.

11 Claims, 6 Drawing Sheets

LIGHT-BEAM HEATING APPARATUS

This application is a continuation of application Ser. No. 07/886,333, filed May 20, 1992, now abandoned.

BACKGROUND OF THE INVENTION

1. Field of the Invention

The present invention relates to a light-beam heating apparatus which makes local heating possible by condensing light from a radiating lamp and is suitable for heating for soldering, removal of a coating of a fine polyurethane wire, or heating treatment of resin and so forth.

2. Description of the Related Art

A light-beam heating apparatus in which light from a radiating lamp is condensed and made to be incident to one end of an optical fiber, and light emitted from another end thereof is condensed by using an optical system, thereby to heat an article to be heated which is placed in the vicinity of a light condensing point has become to be widely used in recent years. In this apparatus, an ellipsoidal reflecting mirror for reflecting and condensing light is used, a light emitting portion of a radiating lamp is positioned at a first focal point thereof, and a light receiving end of the optical fiber is positioned at a second focal point thereof in order to utilize light energy generated in the radiating lamp effectively.

In such a conventional light-beam heating apparatus, the light emitting portion of the radiating lamp is fixed after adjustment to the position of the first focal point by means of a lamp fitting mechanism when service is commenced. The light emitting portion moves due to thermal expansion of the radiating lamp generated thereafter by light radiation and consumption of an electrode of the radiating lamp. As a result, light energy condensed at the second focal point and incident to the light receiving end of the optical fiber is reduced. Even if the light emitting portion of the radiating lamp is arranged in advance at a position shifted from the first focal point by the lamp fitting mechanism taking thermal expansion and electrode consumption into consideration, the converged light is not correctly focused on the light receiving end of the optical fiber until the radiating lamp reaches a predetermined temperature or after the electrode consumption advances to some degree. As a result, the article to be heated is heated in a state of low light energy, and the light energy of the radiating lamp cannot be utilized effectively. Since electrode consumption proceeds further, the light emitting portion comes off the position of the first focal point and heating conditions of the article to be heated are deteriorated similarly to the above, and the light energy of the radiating lamp cannot be utilized effectively. Furthermore, when the life of the radiating lamp has expired and a new radiating lamp is fitted, it is required to readjust the light emitting portion of the new radiating lamp at the position of the first focal point on all such occasions by means of the lamp fitting mechanism. Namely, in order to heat the article to be heated utilizing the light energy of the radiating lamp effectively, it is required to always adjust the lamp fitting mechanism so as to arrange the light emitting portion of the radiating lamp at the position of the first focal point. Due to low efficiency of such an adjustment, it has been impossible to utilize the light energy of the radiating lamp effectively. Further, it is demanded to hold the light energy for heating the article to be heated at a predetermined intensity and also to realize high reproducibility in order to utilize light-beam heating apparatus for industrial purposes. Thus, such a task as to adjust an electric current of a power supply circuit by means of an output con, hand circuit so as to maintain the light energy at a predetermined value is required. In this task, it is required to suspend the heating operation and to measure and confirm a light-beam output which is outputted from a lens holder provided at opposing end of the optical fiber with a power meter and the like.

In order to have the same operating conditions reappear, such a task has to be perforated every time the above-described fluctuation factor is generated. Since the efficiency of the heating operation is lowered, however, performing this task has not been practical.

SUMMMARY OF THE INVENTION

It is an object of the present invention, in order to solve the above-described problems to provide a light-beam heating apparatus which is able to utilize light energy of a radiating lamp and secure operational reproducibility when heating is conducted and which has excellent controllability, responsiveness, stability and maintainability.

In order to achieve the above-described object, a light-beam heating apparatus of the present invention has a structure provided with a radiating lamp, an ellipsoidal reflecting mirror having first and second focal points for condensing light of the radiating lamp, an optical fiber to which the condensed light is inputted, a photodetector which detects the light incident on the light receiving end of the optical fiber, the intensity of the incident light being determined by the position of the emitting portion of the radiating lamp with respect to the first focal point, a radiating lamp fitting mechanism provided with a drive mechanism capable of moving the light emitting portion of the radiating lamp to an optional position in the vicinity of the first focal point of the ellipsoidal reflecting mirror, a photoelectric converter for photoelectrically converting an optical output of the photodetector, and an arithmetic drive circuit for computing a moving direction and a moving quantity of the radiating lamp from the output of the photoelectric converter and outputting a driving signal to the drive mechanism of the radiating lamp fitting mechanism, and provided further with an arithmetic circuit for computing the total quantity of light energy incident to the light receiving end of the optical fiber, an output command circuit for setting a heating output, an error amplification circuit for amplifying an error between the command value of the output con, hand circuit and the output value of the arithmetic circuit, and a power supply circuit capable of optionally setting electric power supplied to the radiating lamp in accordance with the output value of the error amplification circuit. Further, the photodetector is constructed by taking out one line of fiber element wires constituting the optical fiber from a central part of the light receiving end of the optical fiber.

In a light-beam heating apparatus, when a light emitting portion of a radiating lamp is positioned at the first focal point of the ellipsoidal reflecting mirror and the light receiving end of the optical fiber is placed at the second focal point, the intensity of the light condensed at the light receiving end of the optical fiber shows an almost symmetrical bell shaped distribution. Further, when the light emitting portion of the radiating lamp is moved up and down, right and left, and fore and aft in the vicinity of the first focal point, the height of the bell shaped distribution and the axial position giving the maximum intensity are changed.

In a light-beam heating apparatus of the present invention, light intensity at the central part of the light receiving end of the optical fiber is detected using a photodetector, a light intensity signal after photoelectric conversion is inputted to an arithmetic drive circuit, and the drive mechanism of the radiating lamp fitting mechanism is actuated in a direction that the light intensity increases. When the center of the light receiving end of the optical fiber and the central axis of the bell shaped distribution are made to coincide with each other by performing such actuation up and down, left and right, and fore and aft successively, it is possible to have the first focal point of the ellipsoidal reflecting mirror and the light emitting portion of the radiating lamp coincide with each other automatically and with high accuracy. The light energy of the radiating lamp is utilized effectively in this manner. Further, the bell shaped distribution shows a distribution configuration almost close to a Gaussian intensity distribution. The Gaussian intensity distribution curve is expressed by the following expression:

$$I(r) = I(0) \exp(-2r^2/w_o^2) \quad \ldots (1).$$

where, $r$: radial distance; $w_o$: Gaussian radius of beam; $I(r)$: intensity at distance $r$; and $I(0)$: intensity on the central axis.

Furthermore, the total energy $P(r)$ within the radius $r$ is expressed by the following expression:

$$P(r) = (\pi w_o^2/2) I(0) [1 - \exp(-2r^2/w_o^2)] \cdot \cdot \cdot \quad (2).$$

Thus, the total quantity of the light energy incident to the optical fiber is obtainable if $r$, $I(0)$ and $w_o$ are known. Assuming the radius of the optical fiber as $r$, measuring the maximum value obtained by measuring the light intensity according to the detecting positions at the light receiving end of the optical fiber, making the maximum value of the light intensity to be $I(0)$, and then obtaining $w_o$ by using the expression (1), it is possible to obtain the incident energy to the optical fiber. Further, when the distribution of the light intensity is measured separately, $w_o$ is measured in advance, and $I(0)$ is detected with a photodetector arranged at the central part of the light receiving end of the optical fiber, a relationship $P(r) = a \cdot I(0)$ ($a$ is a constant) is obtained, and it is possible to compute the light energy incident to the optical fiber in an arithmetic circuit by using the above relationship. When the error between the value of the light energy incident to the light receiving end of the optical fiber which is measured as described above and the command value of the output command circuit is obtained, and the output value of the power supply circuit is changed in accordance with the error so as to control the electric power supplied to the radiating lamp, it is possible to make constant the light energy incident to the light receiving end of the optical fiber. Accordingly, it is possible to keep the article to be heated in a constant heating condition, and it is always possible to reproduce a desired heating condition.

DESCRIPTION OF THE PREFERRED EMBODIMENTS

Embodiment 1

An embodiment of the present invention will be described hereinafter with reference to the drawings.

Figure 6:
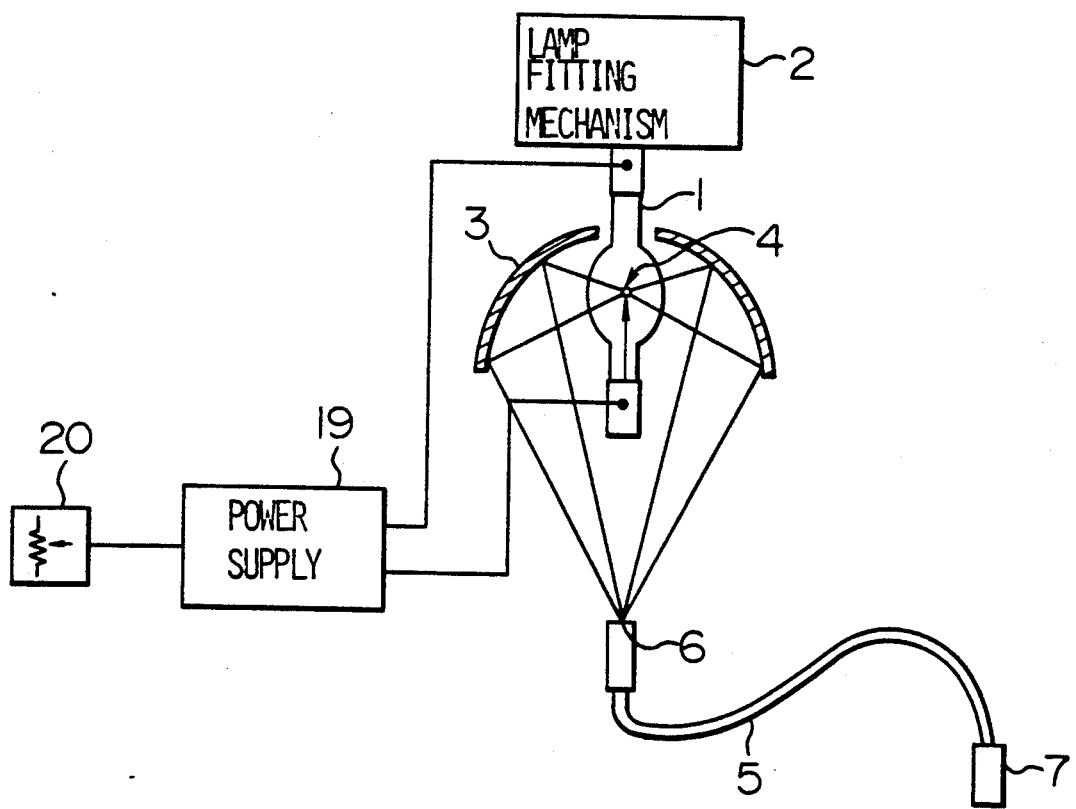
FIG. 6 is a diagram showing a structure of a conventional light-beam heating apparatus.
Figure 7:
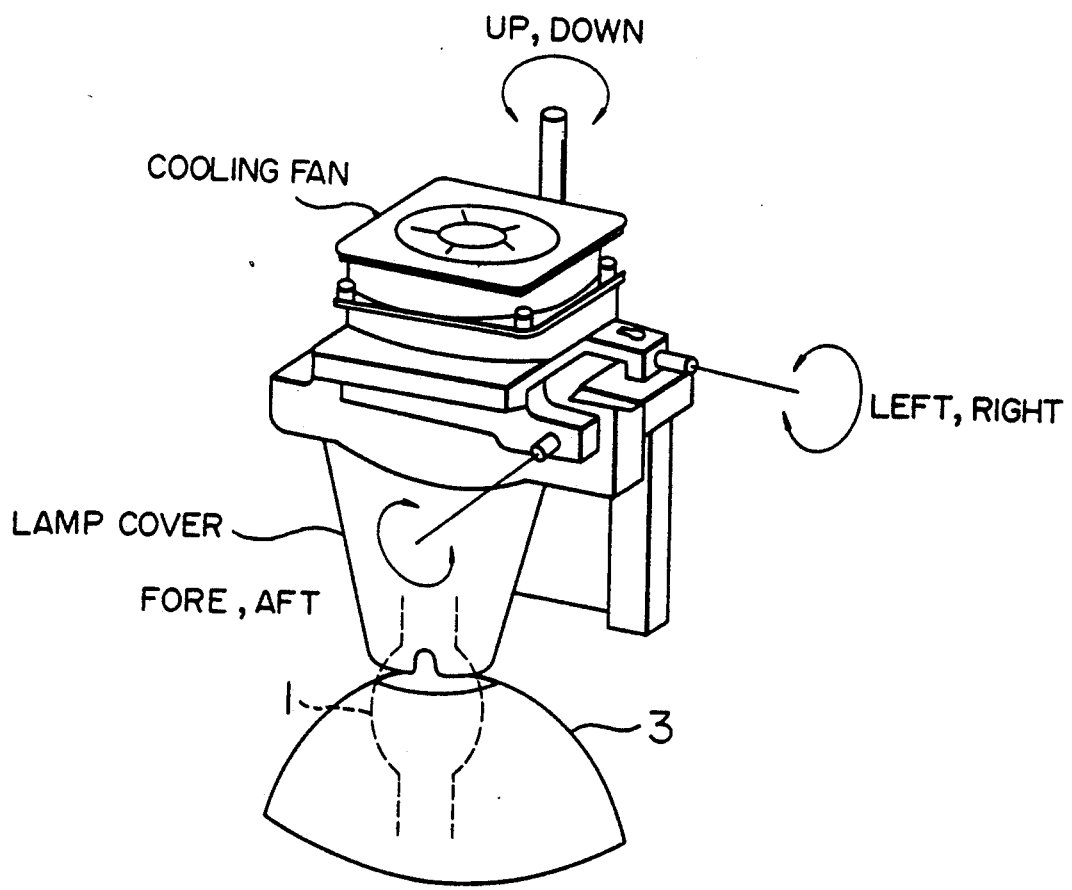
FIG. 7 is a perspective view showing an example of a lamp position adjusting mechanism of a conventional light -beam heating apparatus.

It has been prevalent and popular that a light-beam apparatus of this sort has such a structure as shown in FIG. 6 and FIG. 7. The structure will be described hereinafter referring to FIGS. 6 and 7. As shown in FIG. 6, a radiating lamp 1 such as a xenon lamp is held by a lamp fitting mechanism 2 having a manual position adjusting function, and a light emitting portion of the lamp 1 is adjusted so as to be positioned initially at a first focal point 4 of an ellipsoidal reflecting mirror 3. An input electric current in accordance with a command value of an output command circuit 20 is supplied from a power supply circuit 19. A central part of a light receiving end of an optical fiber 5 is fixed by a mounting bracket (not shown) so as to be positioned at a second focal point 6 of the ellipsoidal reflecting mirror 3. An optical lens system for condensing the light emitted from an emitting end of the optical fiber 5 is incorporated in a lens holder 7. FIG. 7 shows a structure of the lamp fitting mechanism 2, which is able to adjust the position of the radiating lamp 1 by rotating respective adjusting shafts up and down, left and right, and fore and aft, respectively. In the above-described structure, when the light emitting portion of the radiating lamp 1 is arranged at the first focal point 4 of the ellipsoidal reflecting mirror 3 by adjusting the lamp fitting mechanism 2, the light receiving end of the optical fiber 5 is fixed at the second focal point 6, and the radiating lamp 1 is turned on, the condensed light is radiated from the lens holder 7 at the other end of the optical fiber 5, thus making it possible to heat an article to be heated (not shown). A cooling fan is provided at an upper part of the lamp fitting mechanism for cooling the radiating lamp 1.

A light-beam heating apparatus of the present invention is an improved type of above-described conventional apparatus.

Figure 1:
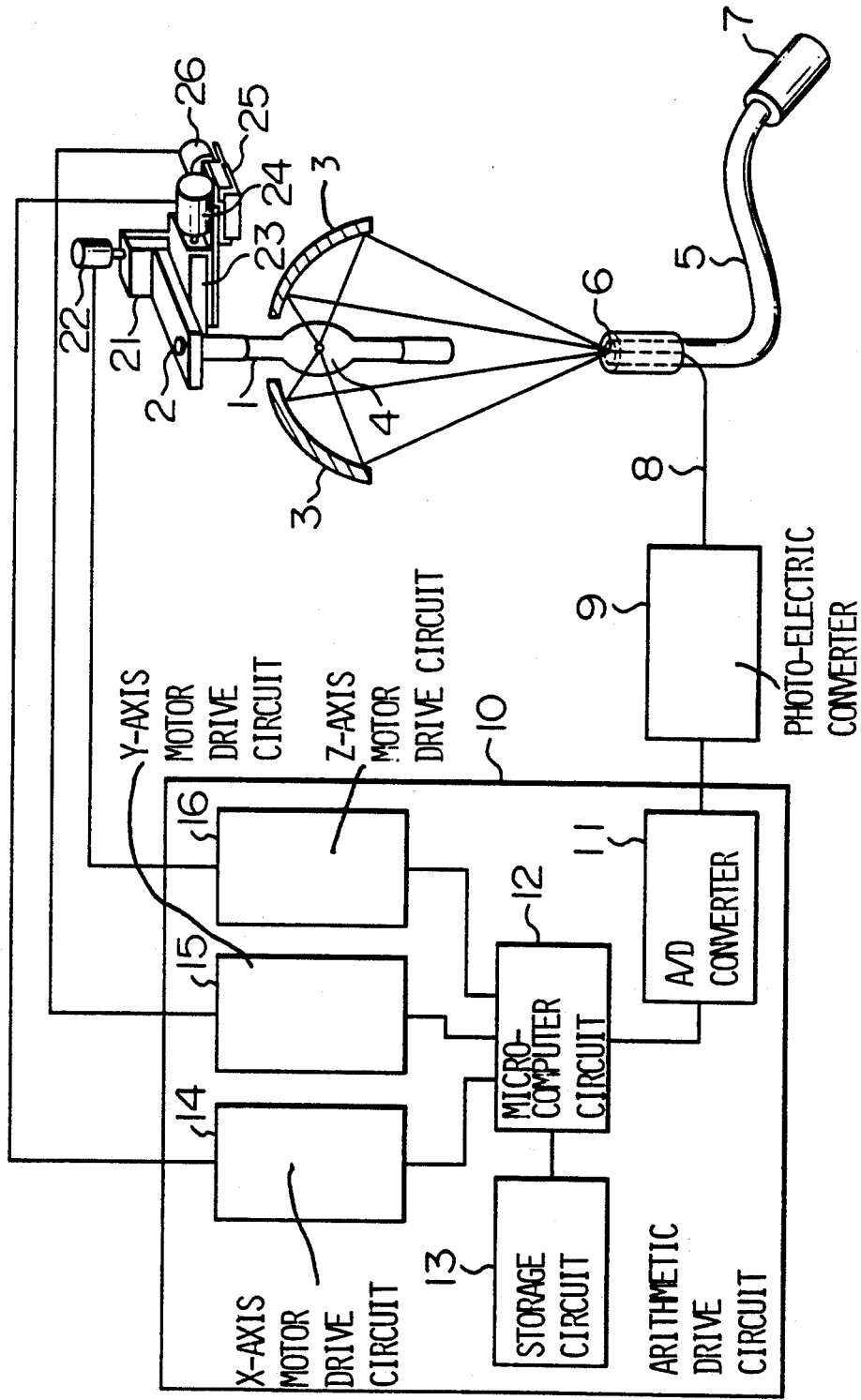
FIG. 1 is a diagramm showing a structure of a light-beam heating apparatus in a first embodiment of the present invention.

As shown in FIG. 1, a radiating lamp 1 is fitted to a lamp fitting mechanism 2. The lamp fitting mechanism 2 is composed of a Z-axis slider 21 furnished with a Z-axis motor 22 for moving the lamp 1 in a vertical direction, an X-axis slider 23 furnished with an X-axis motor 24 for moving the lamp 1 in a horizontal direction, and a Y-axis slider 25 furnished with a Y-axis motor 26 for moving the lamp 1 in a longitudinal direction. The light emitting portion of the radiating lamp 1 is positioned in the vicinity of a first focal point 4 of an ellipsoidal reflecting mirror 3, and a light receiving end of an optical fiber 5 which comprises a bundle of fiber element wires is arranged at a second focal point 6 which is another focal point of the ellipsoidal reflecting mirror 3. Further, a photodetector 8 is constructed by taking out one line of fiber element wires from the center of the light receiving end of the optical fiber 5. The output of this photodetector 8 is inputted to a photoelectric converter 9, and inputted to an arithmetic drive circuit 10 after being converted into a quantity of electricity. The arithmetic drive circuit 10 is composed of an A/D converter 11, a microcomputer circuit 12 including an input/output interface, a storage circuit 13, an X-axis motor drive circuit 14, a Y-axis motor drive circuit 15 and a Z-axis motor drive circuit 16. The X-axis motor drive circuit 14 is connected to the X-axis motor 24, the Y-axis motor drive circuit 15 is connected to the Y-axis motor 26, and the Z-axis motor drive circuit 16 is connected to the Z-axis motor 22, respectively.

Figure 2:
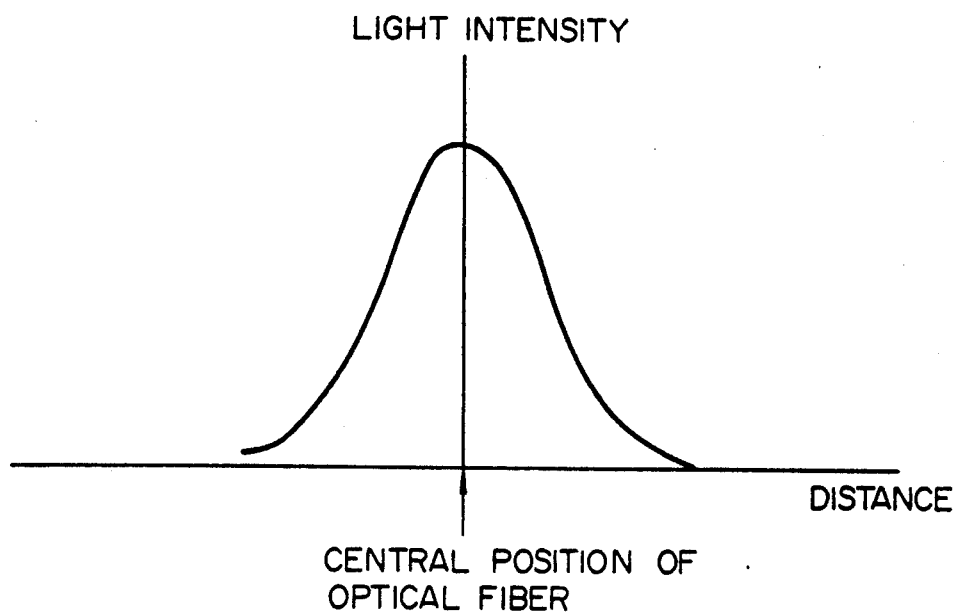
FIG. 2 is a light intensity distribution diagram at a light receivind end of an optical fiber when a light emitting portion of a radiating lamp is located on a first focal point of an ellipsoidal reflecting mirror.

The operation in the above-described structure will be described. The radiating lamp 1 is turned on so as to emit a fixed luminous flux by means of an external power supply (not shogun). Since the light emitting portion is located at the first focal point 4 of the ellipsoidal reflecting mirror 3, the emitted light is condensed with a bell shaped light intensity distribution shown in FIG. 2 as expressed by the expression (1) at the second focal point 6, i.e., at the light receiving end of the optical fiber 5. The photodetector 8, is located at the center of the light receiving end of the optical fiber 5, detects the light intensity at the center of the optical fiber 5 and provides an output according to the light intensity.

Figure 3:
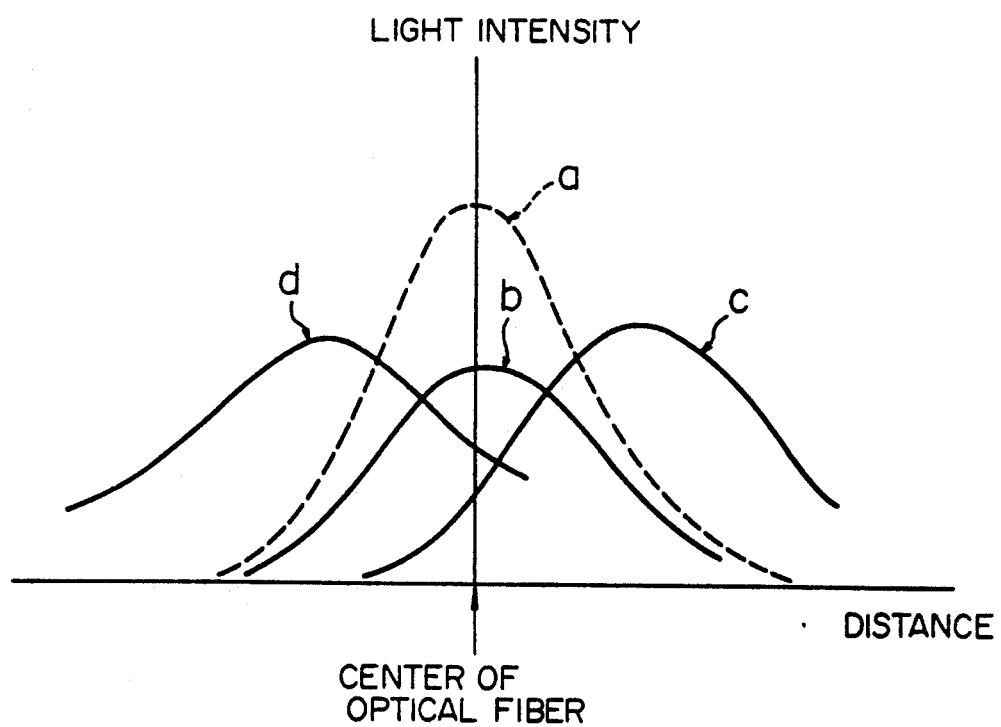
FIG. 3 is an explanatory diagram for explaining a change state of a light intensity distribution at a light receiving end of an optical fiber when the light emitting portion of the radiating lamp moves from the first focal point.

In case the light emitting portion of the radiating lamp 1 slips out of the position of the first focal point by thermal change of the lamp, abrasion of the electrode, or shape difference between the replaced lamp and the originally placed lamp, the condensed light intensity distribution changes as shown in FIG. 3. When the light emitting portion is located exactly at the first focal point, a graph a is shown. When the light emitting portion is displaced in a vertical direction, the peak value is lowered as shown with a graph b. Further, when the light emitting portion is moved in a horizontal or a longitudinal direction, the axis of the distribution is displaced radially, as shown with graphs c or d. For example, the graph c shows a distribution when the light emitting portion is moved to the left, and the graph d shows a distribution when the light emitting portion is moved to the right.

The light intensity at the center of the optical fiber 5 is converted into a quantity of electricity by the photoelectric converter 9 after being detected by the photodetector 8, and converted further into a digital value $A_0$ by means of the A/D converter 11. The microcomputer circuit 12 stores this digital value $A_0$ in the storage circuit 13, and then rotates the X-axis motor 24 by a fixed quantity in a predetermined direction through the X-axis motor drive circuit 14 so as to move the radiating lamp 1 fitted to the lamp fitting mechanism 2 in the X-axis direction. In the present embodiment, the moving quantity corresponding to the rotation by a fixed quantity has been set at a 0.1 mm step. The detected value of the photodetector 8 changes due to movement, and as a result, the output value $A_1$ of the photoelectric converter 9 and the A/D converter 11 changes, too. The microcomputer circuit 12 compares the value $A_1$ with the value $A_0$ stored in the storage circuit 13, and stores $A_1$ in place of $A_0$ in the storage circuit 13 if the output value is increased, i.e., $A_0 < A_1$, and rotates the X-axis motor 24 further by a fixed quantity in the same direction. Then, after a value $A_2$ produced by converting the output value of the photodetector 8 by means of the photoelectric converter 9 and the A/D converter 11 is obtained, the microcomputer circuit 12 compares $A_1$ with $A_2$ again. Further, when the output value is decreased, i.e., $A_0 < A_1$, the microcomputer circuit 12 performs the same processing except the X-axis motor 24 is rotated in a reverse direction and the radiating lamp 1 is moved in a reverse direction.

In such a manner, the X-axis motor 24 is rotated n times by a predetermined quantity at a time, and an n-th value $A_{n-1}$ stored in the storage circuit 13 and a value $A_n$ obtained in the n-th time after photoelectric conversion and A/D conversion of the output value of the photodetector 8 are compared with each other. When the relationship $A_{n-1} \geq A_n$ is obtained as the result of above, the movement in the X-axis direction is terminated. At this time, the position of movement termination may be decided at the $(n-1)$th position in the manner that the X-axis motor 24 is rotated by the fixed quantity in a direction reverse to the moving direction before the termination. After correcting the position of the light emitting portion of the radiating lamp 1 with respect to the X-axis direction, positional correction operations of the light emitting portion in the Y-axis direction and further in the Z-axis direction are performed. The method of operation is the same as the above-described method of positional correction with respect to the X-axis direction, and only the difference exists in that the processing by the microcomputer circuit 12 is to select the X-axis motor drive circuit 14, the Y-axis motor drive circuit 15 or the Z-axis motor drive circuit 16.

As described above, the light intensity at the central part of the light receiving end of the optical fiber 5 is detected by means of the photodetector 8 located at the central part of the light receiving end of the optical fiber 5, a light intensity signal after photoelectric conversion by the photoelectric converter 9 is inputted to the arithmetic drive circuit 10, the drive mechanism of the lamp fitting mechanism 2 is actuated, and the light emitting portion of the radiating lamp 1 is moved in the X-axis direction, the Y-axis direction and the Z-axis direction successively in a direction that increases light intensity.

Thereby, the center of the light receiving end of the optical fiber 5 and the central axis of the distribution of the light condensed by the ellipsoidal reflecting mirror 3 coincide with each other, making it possible to obtain the light distribution having the maximum intensity. In other words, since the first focal point 4 of the ellipsoidal reflecting mirror 3 and the light emitting portion of the radiating lamp 1 are made to coincide with each other automatically and with high accuracy, it is possible to utilize the light energy of the radiating lamp 1 effectively.

Besides, the moving quantity of the light emitting portion is realized by 0.1 mm steps by rotation of the respective axis motors by a predetermined quantity in the present embodiment, but the control speed may be accelerated by varying this value in accordance with a rate of change of the output value of the photodetector 8. Further, the control speed can also be accelerated by performing the movement in respective axial directions simultaneously. In the description of the present embodiment, the axial positions giving peak values of the light intensity in the X, Y and Z axis directions are determined at the first attempt for each axis. However, the moving direction of the light emitting portion of the radiating lamp 1 may be affected by an error between the optical axis direction of the ellipsoidal reflecting mirror 3 and the moving direction of the lamp fitting mechanism 2, and the light emitting portion of the radiating lamp 1 may differ from the first focal point 4 of the ellipsoidal reflecting mirror 3. Therefore, the accuracy is improved when the same processing is repeated several times. A satisfactory result was obtained by repeating the processing three times in the present embodiment.

Embodiment 2

A second embodiment of the present invention will be described hereinafter with reference to the drawings.

Figure 4:
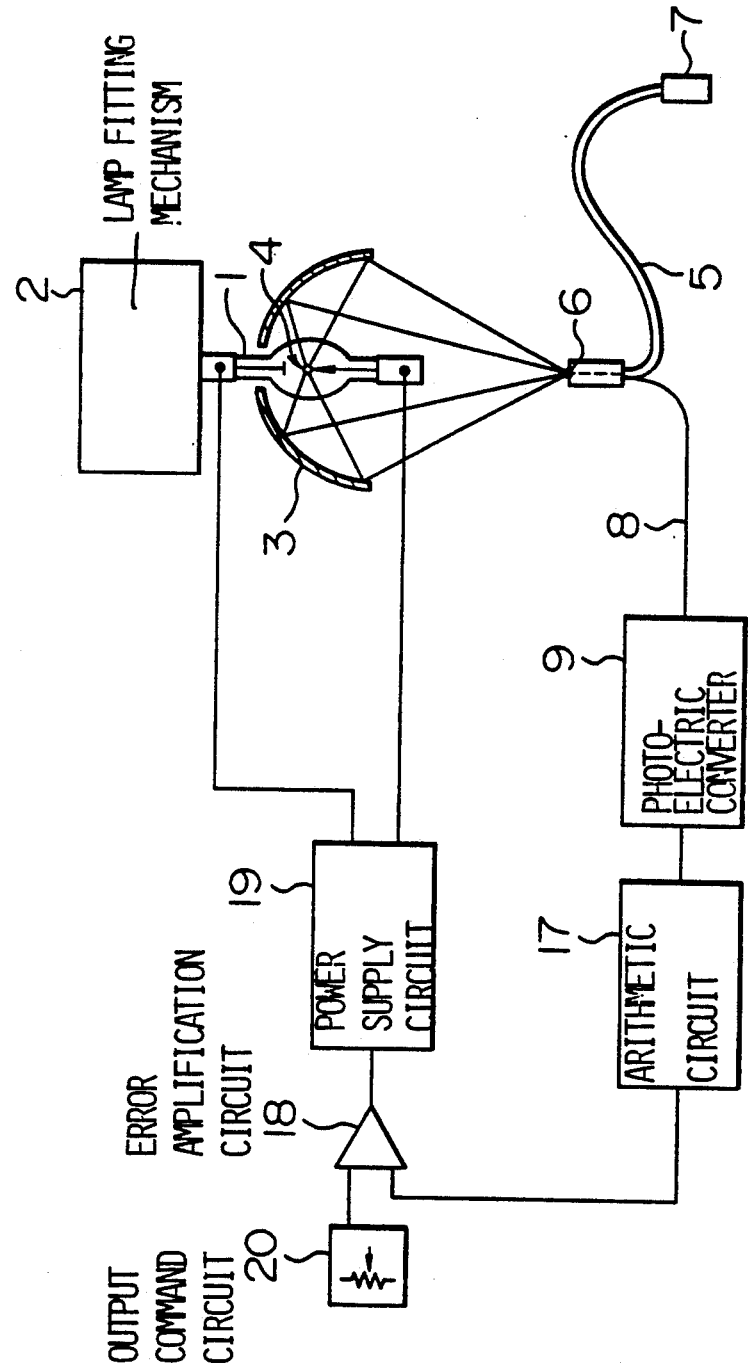
FIG. 4 is a diagram showing a structure of a light-beam heating apparatus in a second embodiment of the present invention.

In FIG. 4, a radiating lamp 1, a lamp fitting mechanism 2, an ellipsoidal reflecting mirror 3, a focal point 4, an optical fiber 5, a second focal point 6, a photodetector 8 and a photoelectric converter 9 are similar to those in the structure shown in FIG. 1, and the light emitting portion of the radiating lamp 1 coincides with the first focal point 4 by the method shown in the embodiment 1, manual adjustment and the like. What is different from the structure shown in FIG. 1 is that the output of the photoelectric converter 9 is inputted to an arithmetic circuit 17, the arithmetic circuit 17 computes the total light energy quantity incident to the above-described optical fiber 5, the output thereof is connected to one end of the input of an error amplification circuit 18, an output of an output command circuit 20 for setting the heating output at a predetermined value is connected to another input thereof, and an error signal of the error amplification circuit 18 is connected to a power supply circuit 19 so as to change the output current thereof, thereby to change the total luminous energy quantity.

Figure 5:
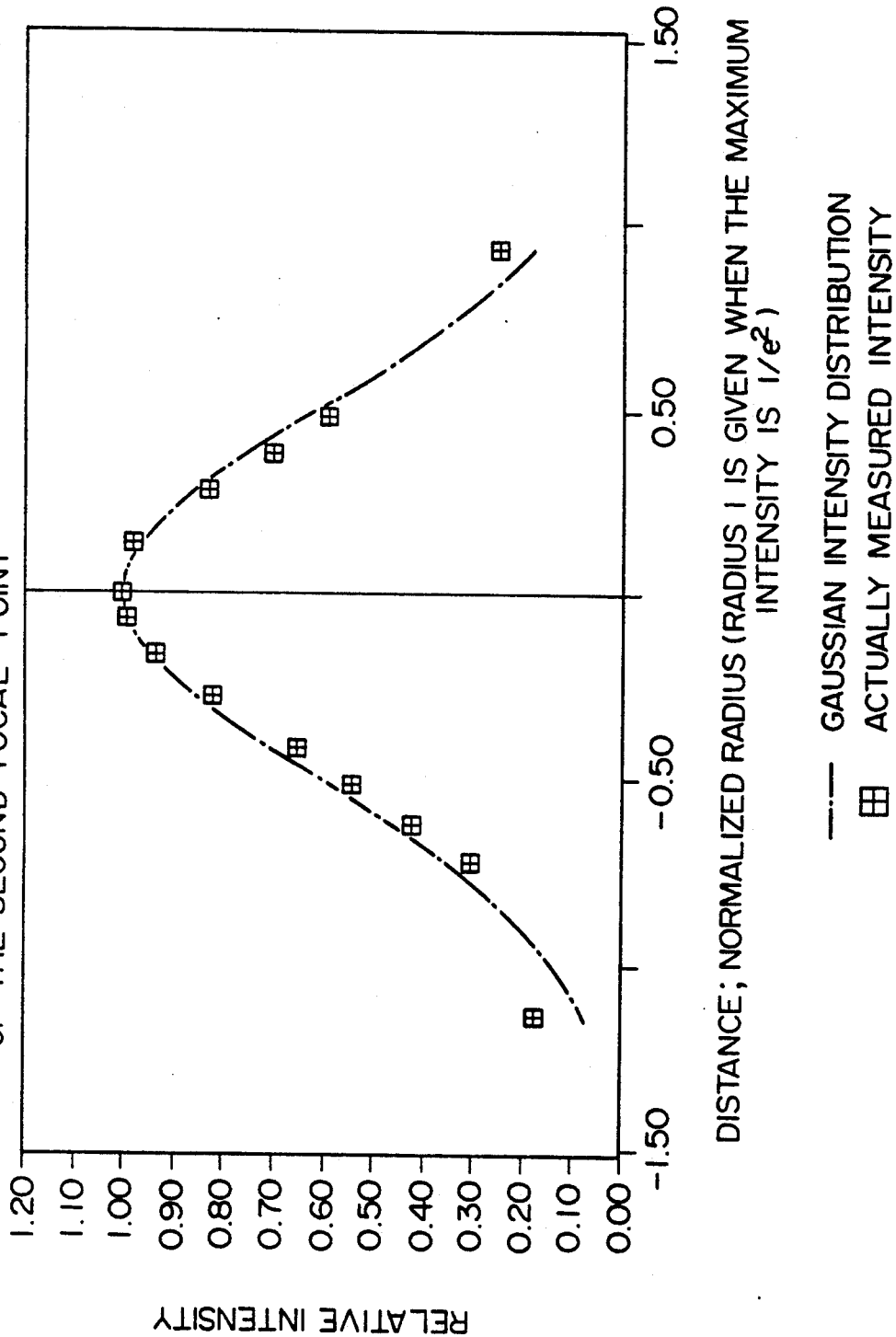
FIG. 5 is an explanatory diagram for explaining a light intensity distribution and a Gaussian intensity distribution at a light receiving end of an optical fiber.

Next, the operation in the above-described structure will be described. The radiating lamp 1 is supplied with an electric current by the power supply circuit 19 so as to be turned on. The characteristic of the power supply circuit 19 suitable for each type of the radiating lamp 1 is to be selected. In the present embodiment, a xenon lamp is used for the radiating lamp 1, and a constant current characteristic is adopted for the power supply characteristic. Since the light emitting portion of the radiating lamp 1 is located at the first focal point 4 of the ellipsoidal reflecting mirror 3, the generated light is condensed in a bell shaped distribution of light intensity shown in FIG. 5 at the second focal point 6, i.e., at the light receiving end of the optical fiber 5. Here, distance r is normalized by $w_o$ called a Gaussian beam radius where the relative intensity becomes $e^{-2}$. This light intensity distribution is close to a Gaussian intensity distribution as described previously, and the Gaussian beam radius $w_o$ has been measured in advance. Since the measuring end of the photodetector 8 is located at the center of the light receiving end of the optical fiber 5, a value $I_O$ in accordance with the light intensity at the center of the light receiving end of the optical fiber 5 is detected. When the light emitting portion of the radiating lamp 1 has a different luminous characteristic due to thermal change of the lamp, abrasion of the electrode, or the difference based on the individual lamp before and after replacement of the lamp, the light intensity at the center of the light receiving end in the intensity distribution of the condensed light changes while maintaining the distribution characteristic as it is, and the detected value of the photodetector 8 changes to become $I_1$. The light intensity at the center of the light receiving end of the optical fiber 5 is converted into a quantity of electricity after being detected by the photodetector 8, and inputted further to the arithmetic circuit 17, where the total light energy quantity $(P(r)=Pw)$ incident to the light receiving end is computed by the expression (2). When the detected value of the photodetector 8 is $I_O$ or $I_1$, the output value of the arithmetic circuit 17 is $Pw_O$ or $Pw_1$, respectively. The value of the output command circuit 20 inputted to one end of the error amplification circuit 18 is set at a value of $Pw_O$ corresponding to the light energy incident to the light receiving end of the optical fiber 5. As a result, an error $(\Delta P = Pw_O - Pw_1)$ is inputted to the error amplification circuit 18 when the detected value of the photodetector 8 shows $I_1$, the amplified output becomes an output control signal of the power supply circuit 19, and the output electric current of the power supply circuit 19 changes to $Pw_O$ from $Pw_1$ in a direction for decreasing $\Delta P$ to zero.

In such a manner, it is possible to maintain the total light energy quantity incident to the light receiving end of the optical fiber 5 at a constant value and to heat the article to be heated under a desired irradiating condition even in case the light emitting portion of the radiating lamp 1 has a different luminous characteristic due to thermal change of the lamp, abrasion of the electrode, or difference between individual lamps before and after replacement of the lamp.

Incidentally, the photodetector 8 is constructed by arranging one line of fiber element wire at the center of the light receiving end of the optical fiber 5. When a plurality of fiber element wires are installed around the center of the light receiving end and the positional information thereof is known, however, it becomes possible to compute the light energy incident to the optical fiber 5 using the above described expressions (1) and (2), and to perform correction on operational processing of the arithmetic circuit 17 even if a difference is produced between the light intensity distribution and the Gaussian intensity distribution at the light receiving end, thereby to perform stabilization and reproduction of the irradiation output having better accuracy.

Further, it is a matter of course that the first and the second embodiments may be executed at the same time.

As it is apparent from the above-described embodiments, according to the present invention, the light intensity at the central part of the light receiving end of the optical fiber is detected by means of a photodetector which is able to detect the light intensity incident at the light receiving end of the optical the intensity of the incident light being determined by the actual position of the light emitting portion of the radiating lamp with respect to the first focal point. e.g., a photodetector constructed by a fiber element wire positioned at the central part of the optical fiber. This light intensity is converted photoelectrically and the light intensity signal after photoelectric conversion is inputted to the arithmetic drive circuit, the drive mechanism of the radiating lamp fitting mechanism is actuated in accordance with the result of computation, and the light emitting portion of the radiating lamp is moved in the X-axis direction, the Y-axis direction and the Z-axis direction successively in a direction that increased the light intensity thus, it is possible to have the center of the light receiving end of the optical fiber and the central axis of the distribution of the light condensed by the ellipsoidal reflecting mirror coincide with each other, and moreover, to obtain the light distribution having the maximum intensity. Namely, since the first focal point of the ellipsoidal reflecting mirror and the light emitting portion of the radiating lamp are made to coincide with each other automatically and with high accuracy, it is possible to utilize the light energy of the radiating lamp effectively. Further, it is also possible to prevent fluctuation of the light radiation output at time of deformation of the electrode due to abrasion of the electrode and thermal expansion of the radiating lamp, thus reducing the focusing adjustment time by a large margin when the radiating lamp is replaced. Thus, it is possible to provide a light-beam heating apparatus which is highly efficient, stabilized in light radiation output and easy in maintenance. Further, a value corresponding to the light energy incident to the light receiving end of the optical fiber is obtained from the light intensity signal after photoelectric conversion by means of the arithmetic circuit on the basis of the light intensity and the positional information on the light receiving end face of the optical fiber, and the output of the power supply circuit for supplying power to the radiating lamp is changed so as to delete the error between this value and the command value which is set by the output command circuit, thereby to hold the light energy incident to the optical fiber end face at a predetermined value. Thus, it is possible to provide a light-beam heating apparatus in which the light radiation output is stabilized, operational reproducibility can be secured when the heating operation is performed, and both controllability and responsiveness are excellent when the desired condition setting is performed.

What is claimed is:

1. A light-beam heating apparatus comprising:

a radiating lamp having a light emitting portion;

an ellipsoidal reflecting mirror having first and second focal points for condensing light emitted by the light emitting portion of said radiating lamp, the light emitting portion of said radiating lamp being positioned initially in a vicinity of said first focal point;

an optical fiber including fiber elements, said optical fiber having a light receiving end located in the vicinity of said second focal point on which the condensed light is incident;

a photodetector for detecting the light incident on the light receiving end of said optical fiber, said photodetector having at least one sensing fiber element and disposed at a fixed position in the light receiving end of said optical fiber and having an optical output corresponding to the intensity of the light incident theron, the intensity of the incident light on said light receiving end having a distribution with a peak derived from the relative positions of said radiating lamp and said ellipsoidal reflecting mirror;

a radiating lamp fitting mechanism provided with a drive mechanism for moving the light emitting portion of said radiating lamp with respect to said first focal point;

a photoelectric converter for photoelectrically converting the optical output of said photodetector into an electrical output, the electrical output of said converter being determined by the position of the peak of the light intensity on the light receiving end with respect to the actual position of the light emitting portion of said radiating lamp; and an arithmetic drive circuit coupled to the output of said photoelectric converter and said drive mechanism, said arithmetic drive circuit generating an estimate of the distribution of the light intensity relative to the fixed position of said sensing fiber element and energizing said drive mechanism to move the light emitting portion of said radiating lamp in at least one direction to said first focal point thereby locating said light intensity peak at a predetermined position on said light receiving end.

2. A light-beam heating apparatus according to claim 1, wherein said photodetector comprises at least one fiber element taken from a central part of the light receiving end of said optical fiber.

3. A light-beam heating apparatus according to claim 1 wherein the light receiving end of said optical fiber is positioned at the second focal point of said ellipsoidal reflecting mirror.

4. A light-beam heating apparatus according to claim 1 wherein said drive mechanism moves the radiating lamp in three orthogonal directions.

5. A light-beam heating apparatus comprising:

a radiating lamp having a light emitting portion;

an ellipsoidal reflecting mirror having first and second focal points for condensing light emitted by the light emitting portion of said radiating lamp, the light emitting portion of said radiating lamp being positioned initially in a vicinity of said first focal point;

an optical fiber including fiber elements, said optical fiber having a light receiving end located in the vicinity of said second focal point on which the condensed light is incident;

a photodetector for detecting the light incident on the light receiving end of said optical fiber, said photodetector comprising at least one sensing fiber element having an end disposed at a fixed position in the light receiving end of said optical fiber and having an optical output corresponding to the intensity of the light incident thereon, the intensity of said incident light on said light receiving end having a distribution with a peak derived from the relative positions of said radiating lamp and said ellipsoidal reflecting mirror;

a photoelectric converter for photoelectrically converting the optical output of said photodetector into an electrical output, the electrical output of said converter being determined by the distribution of the light intensity on said light receiving end with respect to the actual position of the light emitting portion of said radiating lamp;

an arithmetic circuit coupled to the output of said photoelectric converter for computing a total energy of the light incident on said light receiving end and providing a total power signal indicative of said total energy;

an output command circuit for providing a command signal corresponding to a desired heat setting output of the apparatus;

an error amplification circuit having a first input coupled to the total power signal output of said arithmetic circuit and having a second input coupled to the heat setting output of said output command circuit, said error amplification circuit amplifying a difference between said total power signal and said command signal and providing an error signal output corresponding to said difference; and a power supply circuit coupled between the output of said error amplification circuit and said radiating lamp for providing electric power to said radiating lamp, said electric power corresponding to said error signal for maintaining said desired heat setting of said radiating lamp.

6. A light-beam heating apparatus according to claim 5 wherein said photodetector comprises at least one fiber element taken from a central part of the light receiving end of said optical fiber.

7. A light-beam heating apparatus according to claim 5 wherein the light receiving end of said optical fiber is positioned at the second focal point of said ellipsoidal reflecting mirror.

8. A light-beam heating apparatus comprising:

a radiating lamp having a light emitting portion;

an ellipsoidal reflecting mirror having first and second focal points for condensing light emitted by the light emitting portion of said radiating lamp, the light emitting portion of said radiating lamp being positioned initially in a vicinity of said first focal point;

an optical fiber including fiber elements, said optical fiber having a light receiving end located in the vicinity of said second focal point on which the condensed light is incident;

a photodetector for detecting the light incident on the light receiving end of said optical fiber, said photodetector comprising at least one sensing fiber element having an end disposed at a fixed position in the light receiving end of said optical fiber and having an optical output corresponding to the intensity of the light incident thereon, the intensity of said incident light on said light receiving end having a distribution with a peak derived from the relative positions of said radiating lamp and said ellipsoidal reflecting mirror;

a radiating lamp fitting mechanism provided with a drive mechanism for moving the light emitting portion of said radiating lamp with respect to said first focal point;

a photoelectric converter for photoelectrically converting the optical output of said photodetector into an electrical output, the electrical output of said converter being determined by a position of the peak of the light intensity on said light receiving end with respect to the position of the light emitting portion of said radiating lamp;

an arithmetic drive circuit coupled to the output of said photoelectric converter and said drive mechanism, said arithmetic drive circuit generating an estimate of the distribution of the light intensity relative to the fixed position of said sensing fiber element and energizing said drive mechanism to move the light emitting portion of said radiating lamp in a least one direction to said first focal point to locate said light intensity peak at a predetermined position on said light receiving end;

an arithmetic circuit coupled to the output of said photoelectric converter for computing a total energy of the light incident on said light receiving end and providing a total power signal indicative of said total energy;

an output command circuit for providing a command signal corresponding to a desired heat setting output of the apparatus;

an error amplification circuit having a first input coupled to the total power signal output of said arithmetic circuit and having a second input coupled to the heat setting output of said output command circuit, said error amplification circuit amplifying a difference between said total power signal and said command signal and providing an error signal output corresponding to said difference; and a power supply circuit coupled between the output of said error amplification circuit and said radiating lamp for providing electric power to said radiating lamp, said electric power corresponding to said error signal for maintaining said desired heat setting of said radiating lamp.

9. A light-beam heating apparatus according to claim 8, wherein said photodetector comprises at least one fiber element taken from a central part of the light receiving end of said optical fiber.

10. A light-beam heating apparatus according to claim 8 wherein the light receiving end of said optical fiber is positioned at the second focal point of said ellipsoidal reflecting mirror.

11. A light-beam heating apparatus according to claim 8 wherein said drive mechanism moves the radiating lamp in three orthogonal directions.

* * * * *